US010355796B2

(12) United States Patent
Yamamoto et al.

(10) Patent No.: US 10,355,796 B2
(45) Date of Patent: Jul. 16, 2019

(54) METHOD AND APPARATUS FOR SETTING VALUES OF PARAMETERS

(71) Applicant: YAMAHA CORPORATION, Hamamatsu-shi, Shizuoka-ken (JP)

(72) Inventors: Tomohiro Yamamoto, Hamamatsu (JP); Shunichi Kamiya, Hamamatsu (JP); Kotaro Terada, Hamamatsu (JP); Masato Suzuki, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 257 days.

(21) Appl. No.: 15/079,703

(22) Filed: Mar. 24, 2016

(65) Prior Publication Data

US 2016/0283187 A1 Sep. 29, 2016

(30) Foreign Application Priority Data

Mar. 25, 2015 (JP) ................................ 2015-062605

(51) Int. Cl.
*G06F 3/048* (2013.01)
*H04H 60/04* (2008.01)

(52) U.S. Cl.
CPC .................................. *H04H 60/04* (2013.01)

(58) Field of Classification Search
None
See application file for complete search history.

(56) References Cited

U.S. PATENT DOCUMENTS

| | | | | |
|---|---|---|---|---|
| 2002/0130715 A1* | 9/2002 | Naron | H03F 3/181 330/2 |
| 2005/0262451 A1* | 11/2005 | Remignanti | G06F 3/04847 715/833 |
| 2006/0066628 A1* | 3/2006 | Brodie | G06T 11/00 345/594 |
| 2006/0204021 A1* | 9/2006 | Okabayashi | H03G 5/025 381/103 |
| 2009/0157201 A1* | 6/2009 | Oguri | G06F 3/04847 700/83 |

(Continued)

FOREIGN PATENT DOCUMENTS

JP 2004012842 A 1/2004

OTHER PUBLICATIONS

"How to improve sound quality in iTunes", https://www.cnet.com/how-to/how-to-improve-sound-quality-in-itunes/, Dec. 4, 2012, 7 pages. (Year: 2012).*

*Primary Examiner* — Andrey Belousov
*Assistant Examiner* — Haimei Jiang
(74) *Attorney, Agent, or Firm* — Rossi, Kimms & McDowell LLP

(57) ABSTRACT

A first mode (one-knob off mode) and a second mode (one-knob on mode) are provided as modes for setting parameters. In the first mode, individual elements corresponding to respective parameters of a parameter set are displayed in an operable state, allowing setting of individual parameters. In the second mode, the individual elements are displayed in a non-operable state, and one-element is displayed in an operable state, and a plurality of parameters of the parameter set are controlled by operating the one-element. At the time of switching from the first mode to the second mode, the parameter set is initialized.

8 Claims, 9 Drawing Sheets

(56) References Cited

U.S. PATENT DOCUMENTS

| | | | | | |
|---|---|---|---|---|---|
| 2009/0290725 | A1* | 11/2009 | Huang | H03G 5/165 | 381/103 |
| 2011/0301810 | A1* | 12/2011 | Hisatsugu | B60H 1/0065 | 701/36 |
| 2012/0063614 | A1* | 3/2012 | Crockett | G11B 20/10527 | 381/98 |
| 2013/0158628 | A1* | 6/2013 | Kothandaraman | A61N 1/3605 | 607/46 |
| 2014/0358780 | A1* | 12/2014 | Fujioka | G06F 21/34 | 705/44 |
| 2015/0169280 | A1* | 6/2015 | Suzuki | H03G 5/025 | 715/716 |
| 2015/0263871 | A1* | 9/2015 | Terada | H04L 27/01 | 375/232 |

* cited by examiner

{Fig. 1}
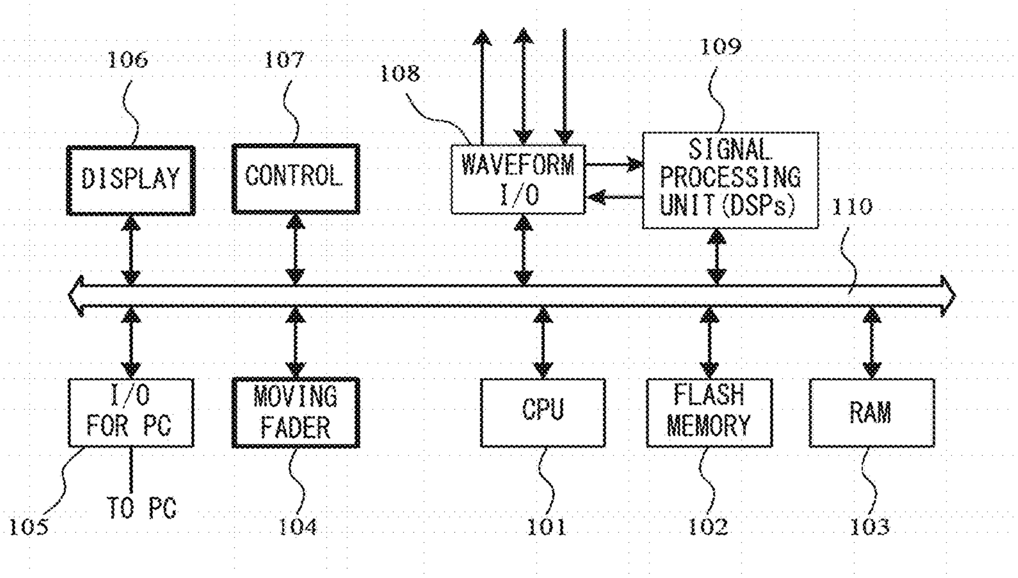
{Fig. 2}
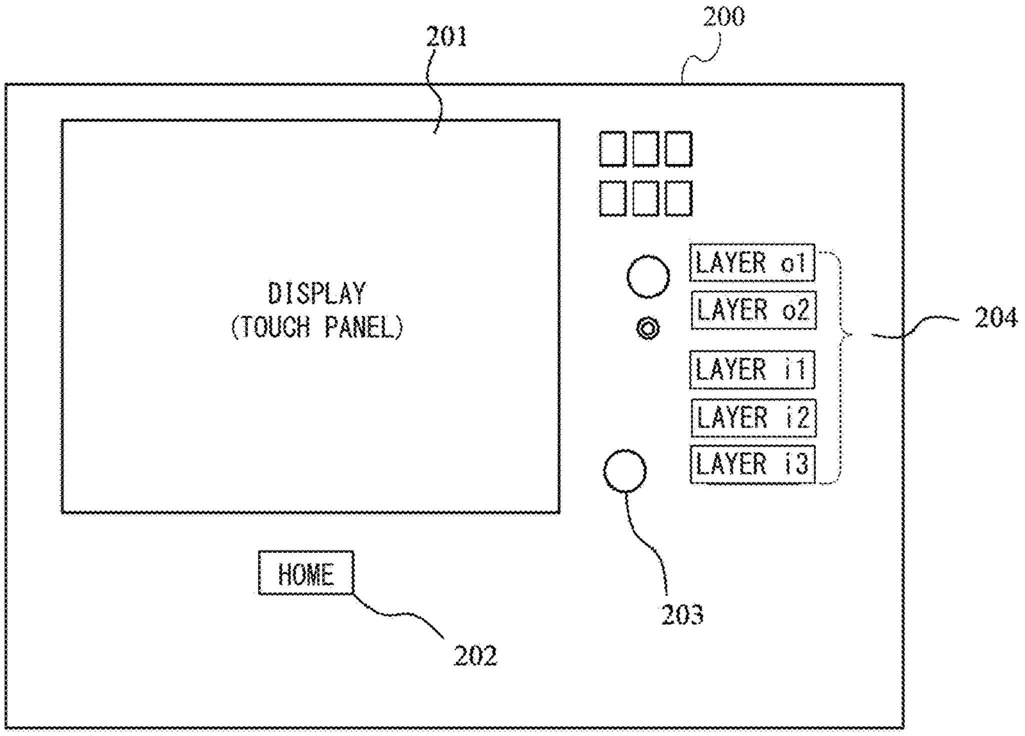

{Fig. 3}
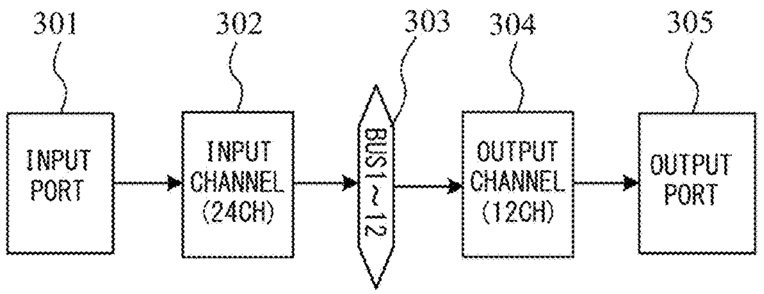
{Fig.4}
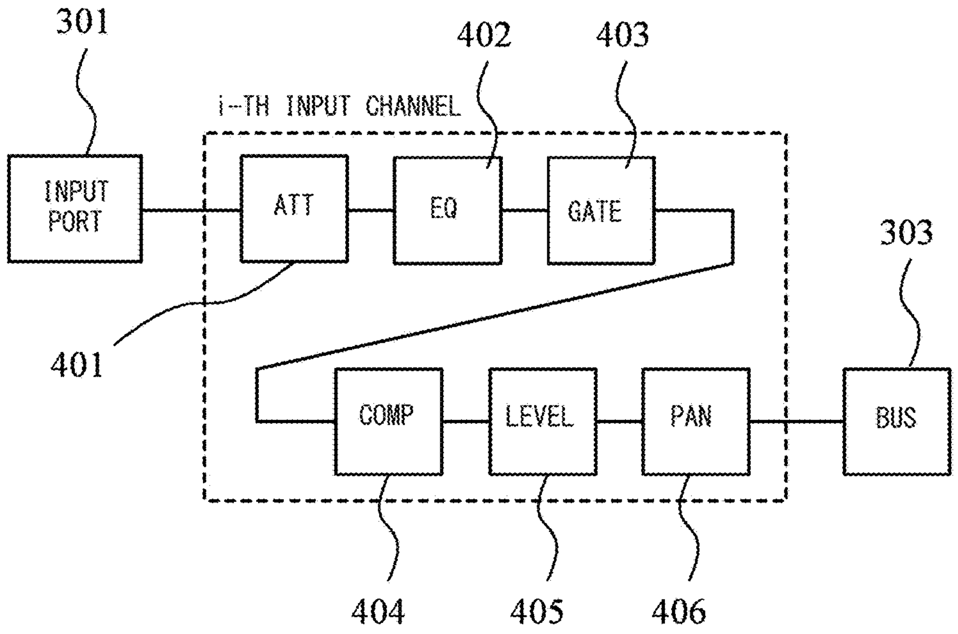

{Fig.5}
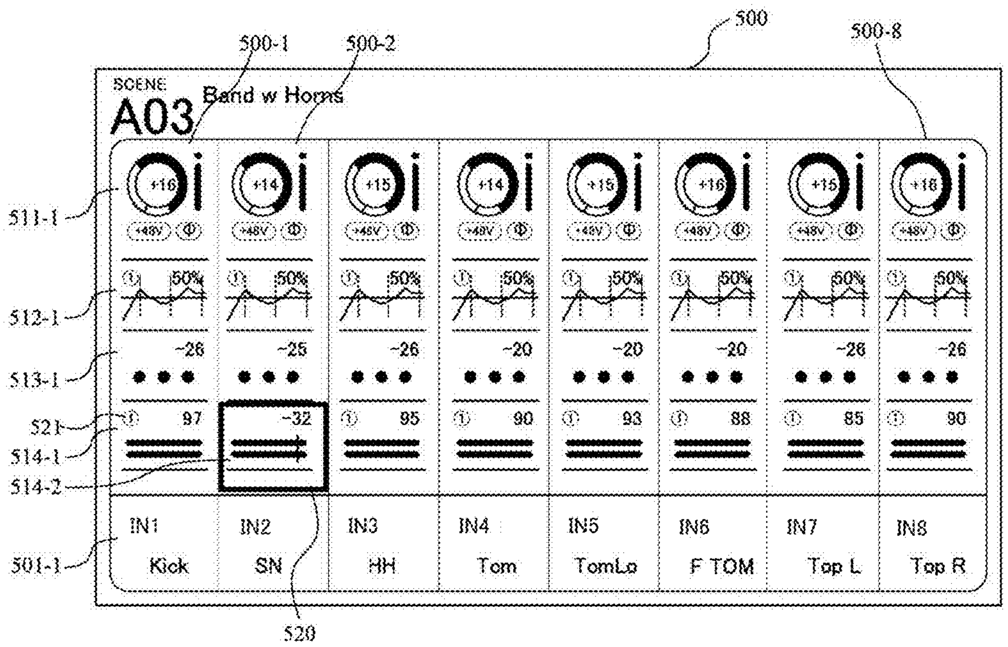
{Fig.6}
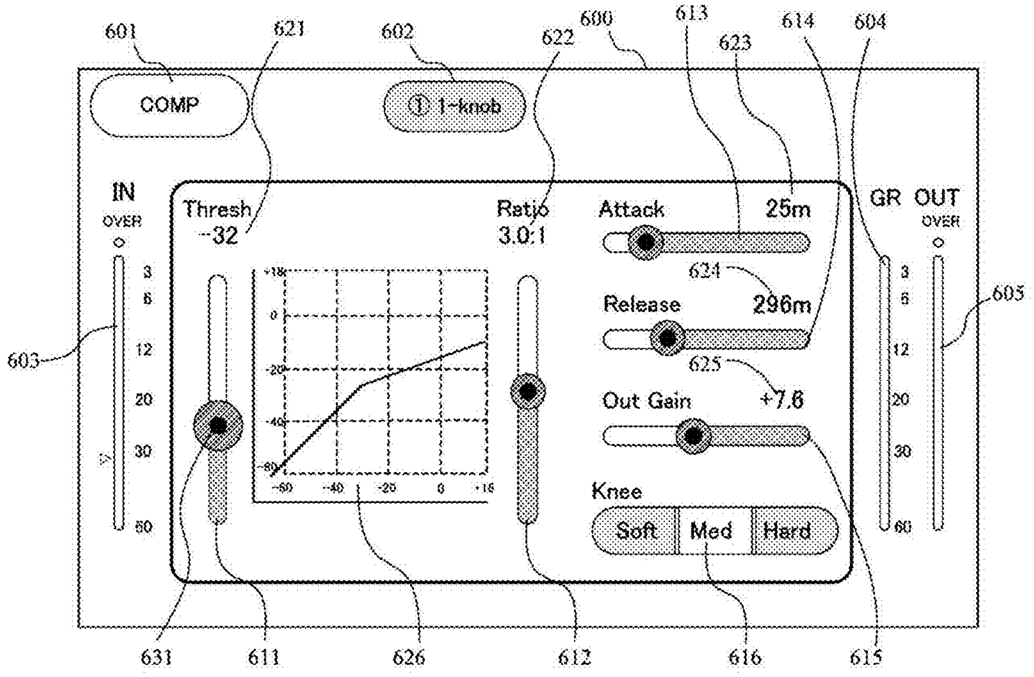

{Fig.7}
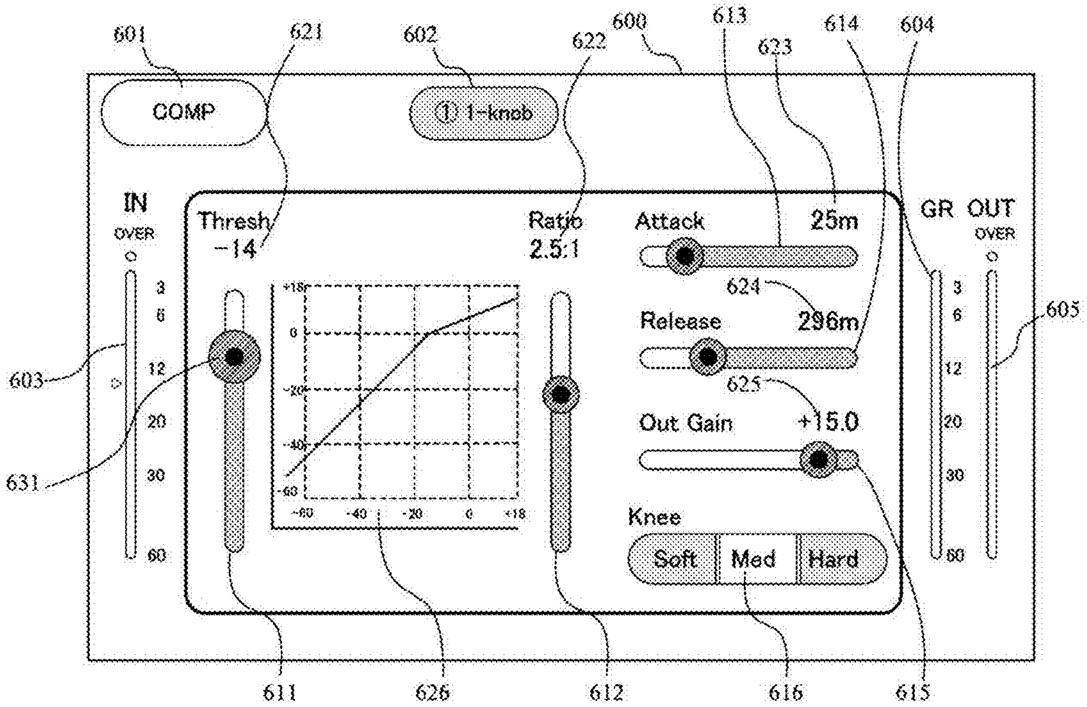
{Fig.8}
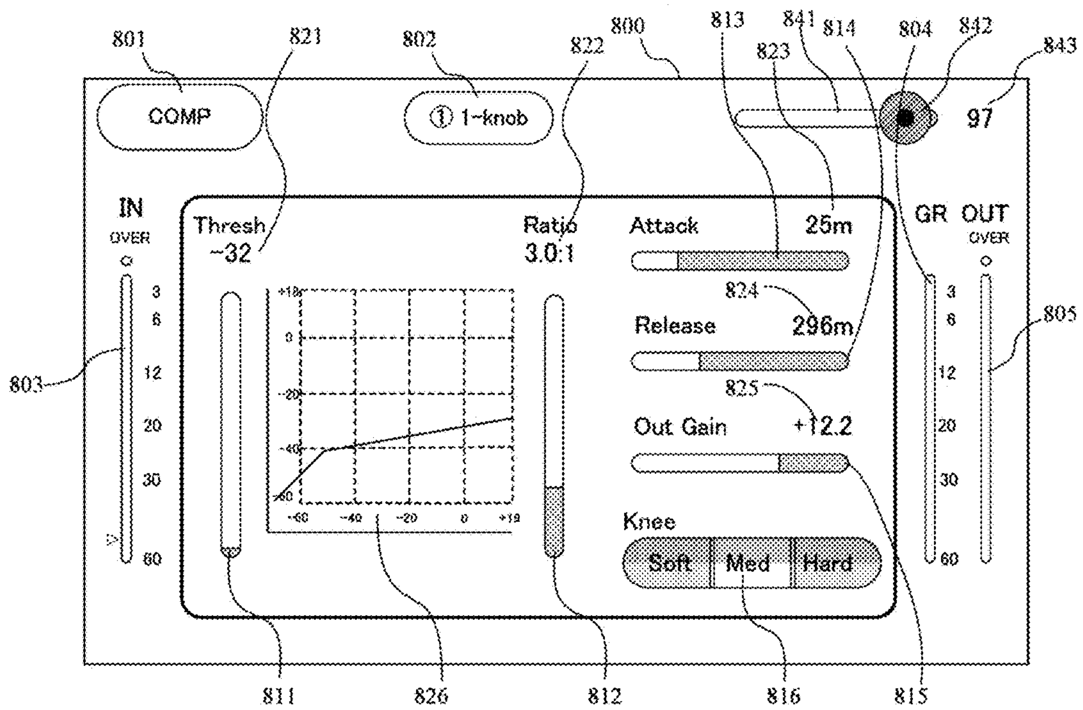

{Fig.9}
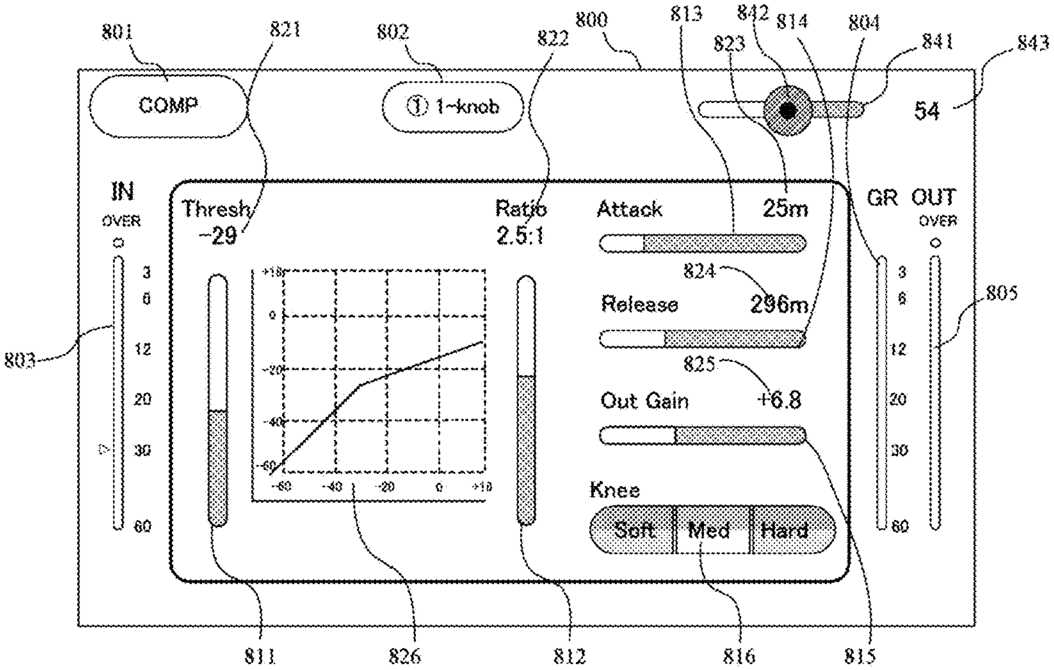
{Fig.10}
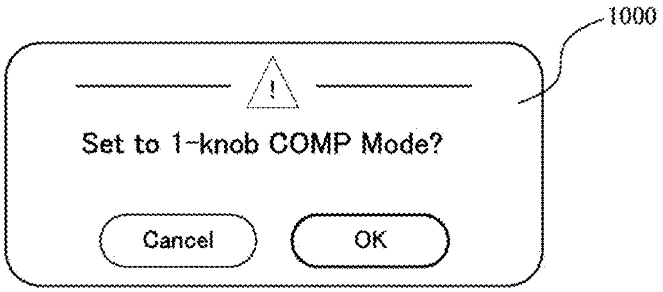

{Fig.11}
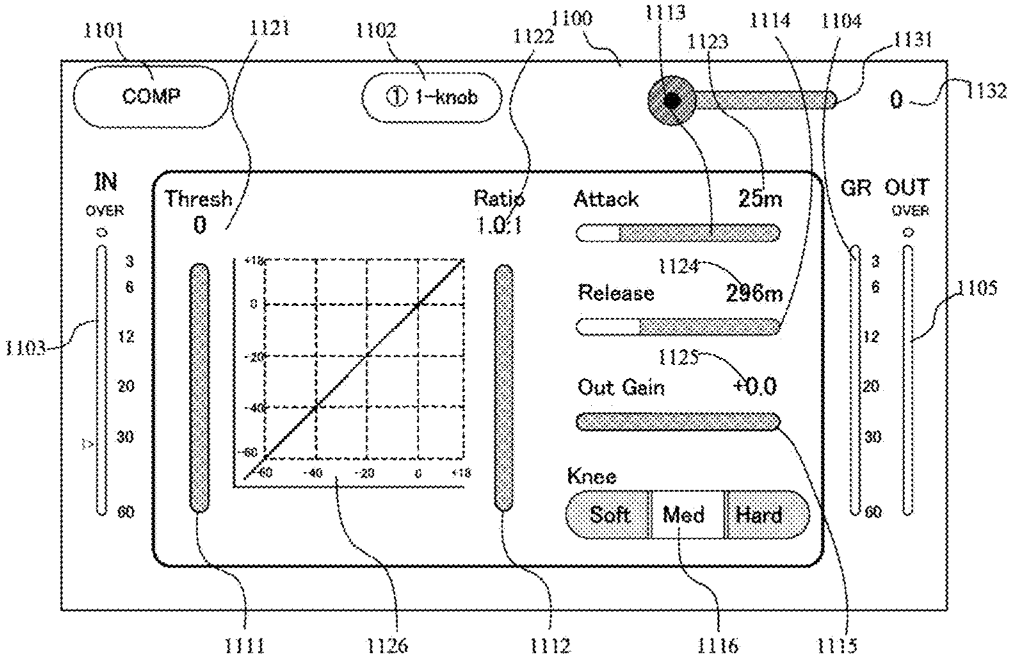

{Fig.12A}
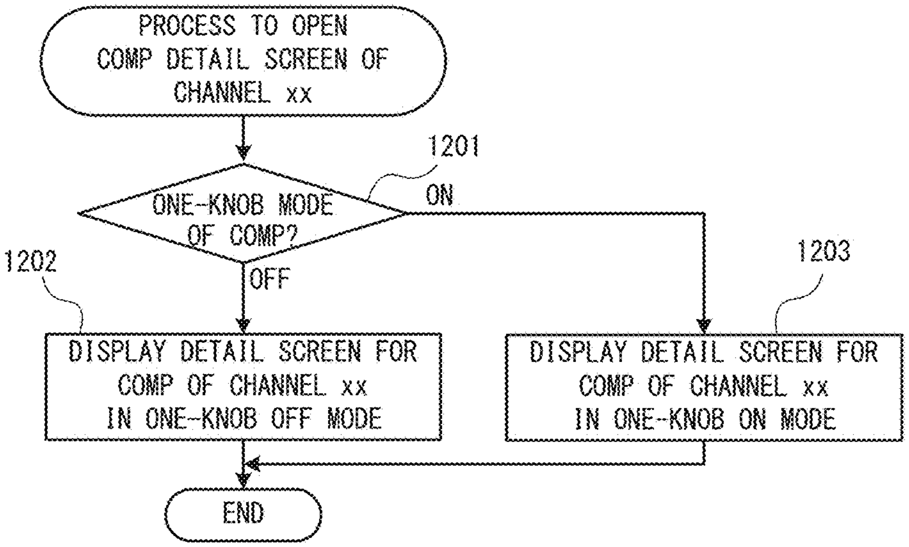
{Fig.12B}
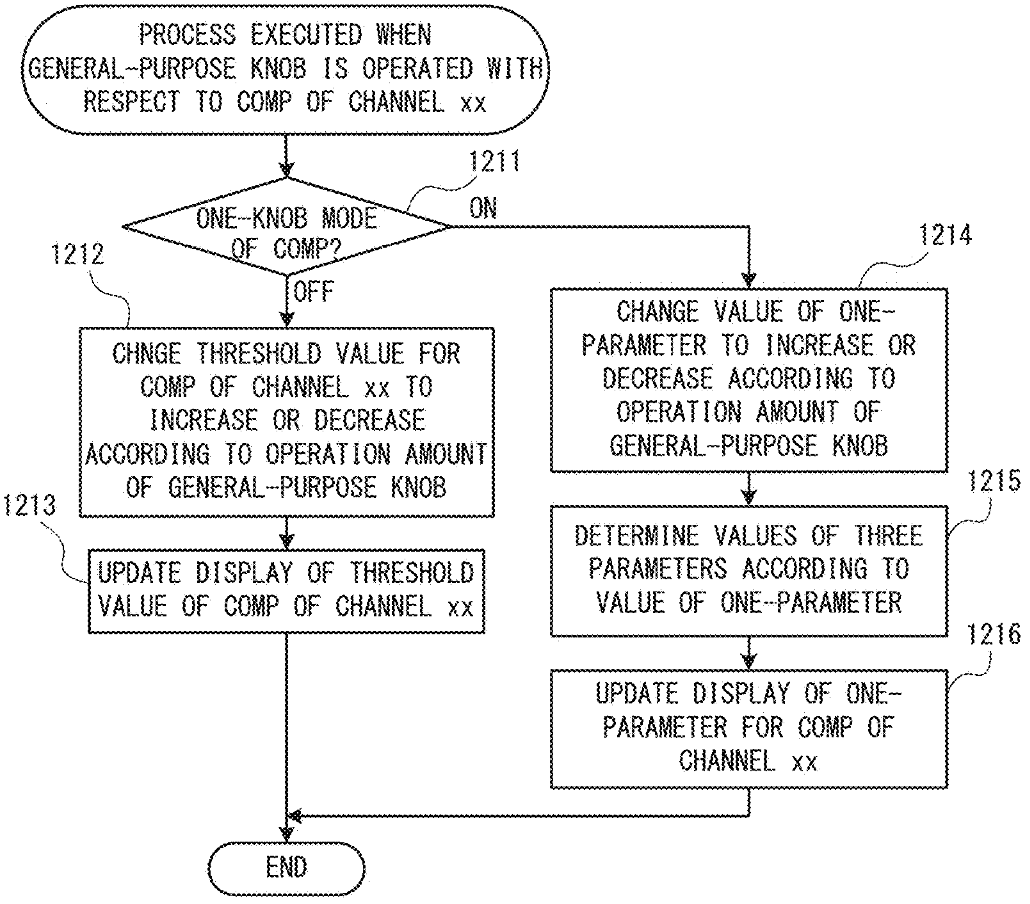

{Fig.13A}
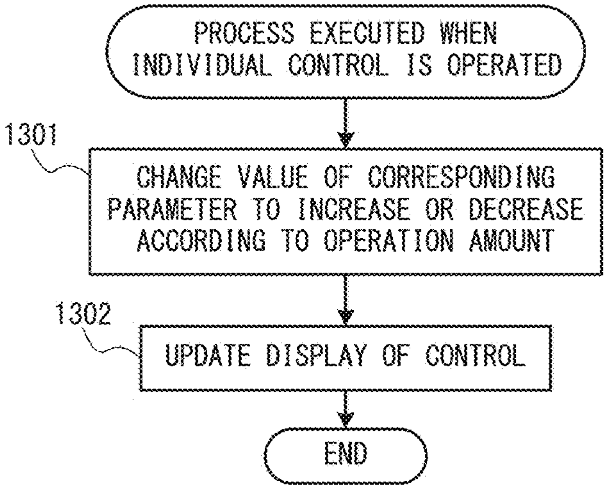
{Fig.13B}
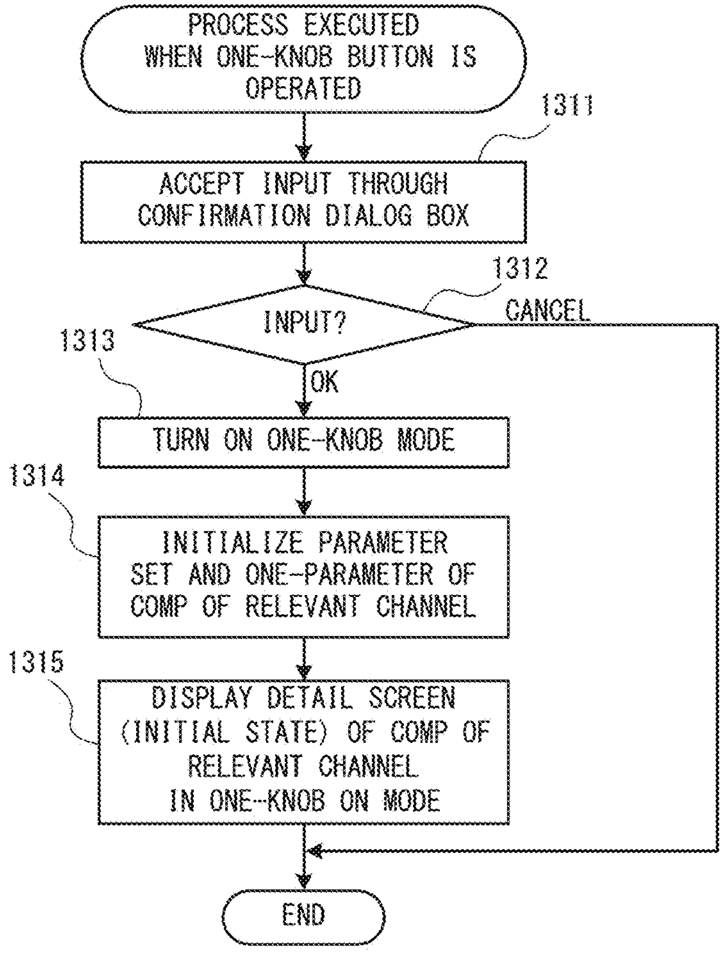

{Fig.14A}
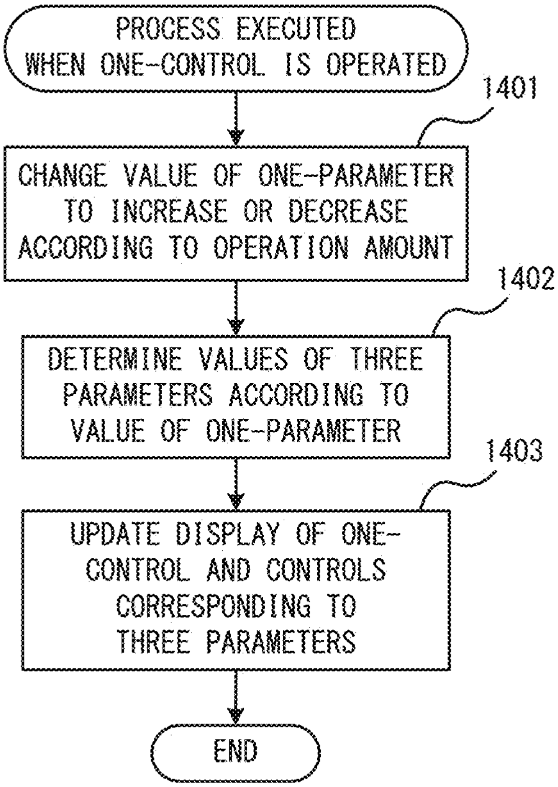
{Fig.14B}
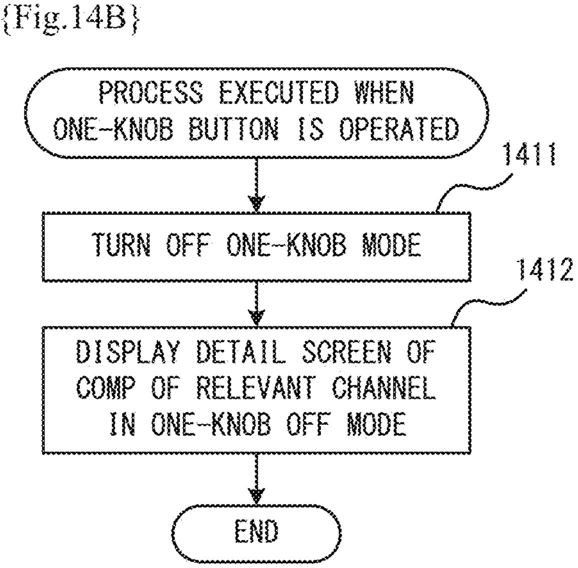

METHOD AND APPARATUS FOR SETTING VALUES OF PARAMETERS

TECHNICAL FIELD

The invention relates to a method and an apparatus for setting values of parameters of a parameter set of an audio device such as a digital mixer.

BACKGROUND ART

An audio device such as a digital mixer generally includes a plurality of channels, such as input channels and output channels. Generally, each channel is constituted of a plurality of processing blocks. For example, for an input channel, the processing blocks are an attenuator (ATT), an equalizer (EQ), a gate (GATE), a compressor (COMP), and the like. Each processing block executes signal processing based on values of a plurality of parameters which are set thereto. The user can arbitrarily set the values of these parameters in each channel by operating respective controls on a control panel, or the like. Generally, a plurality of parameters defining operation of one processing block is controlled with a plurality of individual controls corresponding to the respective parameters.

Further, there is known technology for linking parameters to one common control and controlling the linked parameters in an interlocked manner using the one common control. For example, PTL1 below discloses a parameter setting device capable of changing values of a plurality of items of parameters in an interlocked manner according to a predetermined variation table by operating one knob, which is a common control (see paragraphs 0018, 0024 to 0028, and so on of PTL1).

CITATION LIST

Patent Literature

{PTL1} JP 2004-12842 A

SUMMARY OF INVENTION

Technical Problem

By combining the above-described technique for controlling a plurality of parameters using a plurality of individual controls and the above-described technique for controlling a plurality of parameters in an interlocked manner using one common control, it may be possible to obtain a parameter setting device which allows controlling the values of the plurality of parameters using the plurality of individual controls and the one common control. However, in this case, there is a problem that it is not easy for a user to recognize, by just looking at the individual values of the plurality of parameters, whether the values of the plurality of parameters are values which are set in the interlocked manner using one common control or values which are set individually using a large number of individual controls.

It is an object of the invention to provide a parameter setting method which is easily understandable and convenient for a user in a case when control of a plurality of parameters using a plurality of individual controls and that control thereof in an interlocked manner using one common control are combined.

Solution to Problem

To attain the above object, a method of the invention is a method for setting values of parameters of a parameter set of a processing block of an audio device, the method including: on accepting a first switching instruction from a user, switching the processing block from a second mode into a first mode while keeping the values of parameters of the parameter set of the processing block unchanged; while the processing block is in the first mode, controlling a display to display individual elements indicating the values of individual parameters of the parameter set of the processing block in an operable state; on accepting an operation on an element among the individual elements from the user, changing a value of a parameter corresponding to the element; on accepting a second switching instruction from the user, initializing the values of the parameter set of the processing block and switching the processing block from the first mode into the second mode; while the processing block is in the second mode, controlling the display to display the individual elements indicating the values of the individual parameters of the parameter set of the processing block in a non-operable state, and further display one-element indicating a value of one-parameter; on accepting operation on the one-element from the user, changing the value of the one-parameter, and controlling values of parameters among the parameter set of the processing block based on the value of the one-parameter.

In such a method for setting the parameter set, it is conceivable that the method further includes, after accepting the second switching instruction and before executing the initializing, accepting a permission from the user, and wherein the initializing and the switching of the processing block into the second mode is executed only if the permission is accepted.

Further, it is also conceivable that the audio device includes a plurality of processing blocks and each processing block is independently set in the first mode or in the second mode, and the method further includes: controlling the display to display an overview screen including a plurality of block display areas corresponding to the plurality of the processing blocks and each displaying information of the corresponding processing block, and a block display area of a processing block in the first mode displays a value of a representative parameters among the parameter set of the processing block and a block display area of a processing block in the second mode displays the value of the one-parameter of the processing block.

Furthermore, it is also conceivable that the method further includes: while a block display area of a processing block in the first mode is selected, on accepting a value change instruction from the user, changing a value of a representative parameter of the processing block, and while a block display area of a processing block in the second mode is selected, on accepting a value change instruction from the user, changing the value of the one-parameter of the processing block and controlling the values of parameters among the parameter set of the processing block based on the value of the one-parameter.

Further, in the above method, it is also conceivable that the controlling values of parameters among the parameter set based on the value of the one-parameter is performed based on a variation curve defining variation in the values of the plurality of parameters in accordance with the value of the one-parameter, a plurality of the variation curves are prepared, and one of the variation curves is selected for use in the controlling values of parameters.

Further, it is also conceivable that values of which parameters are controlled based on the value of the one-parameter is respectively defined for each of the variation curves.

Alternatively, it is also conceivable that the one of the variation curves is selected based on setting on type of an audio signal to be processed in the processing block.

The above configurations can be realized or embodied as an arbitrary style such as a device, a system, a computer program, a storage medium storing a computer program, other than the above method.

Note that the first mode corresponds to a state where a one-knob mode (described later) is turned off (a one-knob off mode), the second mode corresponds to a state where the one-knob mode is turned on (a one-knob on mode), the individual elements correspond to individual controls (described later), and the one-element corresponds to an one-control (described later).

Advantageous Effects of Invention

The above configuration is easily understandable and convenient for various users to control a set of parameters of a processing block.

BRIEF DESCRIPTION OF DRAWINGS

FIG. 1 illustrates a hardware configuration of a digital mixer which is an embodiment of the invention.

FIG. 2 is a partial exterior view of a control panel of the mixer of the embodiment.

FIG. 3 is a block diagram of signal processing in the mixer of the embodiment.

FIG. 4 is a block diagram of an input channel in the mixer of the embodiment.

FIG. 5 illustrates an example of a home screen.

FIG. 6 illustrates a first example of a detail screen for a compressor in one-knob off mode.

FIG. 7 illustrates a second example of a detail screen for a compressor in one-knob off mode.

FIG. 8 illustrates a first example of a detail screen for a compressor in one-knob on mode.

FIG. 9 illustrates a second example of a detail screen for a compressor in one-knob on mode.

FIG. 10 illustrates an example of a confirmation dialog box.

FIG. 11 illustrates an example of an initial state of a detail screen of the compressor just after switching the compressor into one-knob on mode.

FIG. 12A is a flowchart of process executed by a CPU while the home screen is displayed.

FIG. 12B is a flowchart of process executed by a CPU while the home screen is displayed.

FIG. 13A is a flowchart of process executed by a CPU while the detail screen in one-knob off mode is displayed.

FIG. 13B is a flowchart of process executed by a CPU while the detail screen in one-knob off mode is displayed.

FIG. 14A is a flowchart of process executed by a CPU while the detail screen in one-knob on mode is displayed.

FIG. 14B is a flowchart of process executed by a CPU while the detail screen in one-knob on mode is displayed.

DESCRIPTION OF EMBODIMENTS

Hereinafter, embodiments of the invention will be described by using drawings.

FIG. 1 illustrates a hardware configuration of a digital mixer as an embodiment of the invention. A central processing unit (CPU) 101 is a processor for controlling operation of the entire mixer. A flash memory 102 is a non-volatile memory storing various programs executed by the CPU 101, various data, and the like. A random access memory (RAM) 103 is a volatile memory used as a load area and a work area for a program executed by the CPU 101. The RAM 103 is provided with a storage area which is called a current memory, and the CPU 101 controls various types of signal processing performed in a signal processing unit 109 or the like, which will be described later, based on the current values of various parameters stored in the current memory. A moving fader 104 is a control for level setting provided on a control panel of the mixer. An I/O (input and output interface) 105 for PC is an interface for connecting to a PC (personal computer).

A display unit 106 is a display device provided on the control panel for displaying various information, and is a touch panel capable of detecting a touch operation by a user of the mixer. A control 107 includes various controls provided on the control panel to be operated by the user (a rotary encoder, a switch, a button, and so on, other than the moving fader). Note that blocks depicted with bold lines in FIG. 1 are components constituting the control panel. A waveform I/O (audio signal input and output interface) 108 is an interface for exchanging audio signals with external devices. A signal processing unit (DSPs) 109 executes various microprograms based on instructions from the CPU 101, so as to perform signal processing, such as mixing processing, effect adding processing, and volume level control processing, on an audio signal inputted via the waveform I/O 108 and output the resultant audio signal after being processed via the waveform I/O 108. The bus 110 is a bus line for connecting the above units, and is a general name given to a control bus, a data bus, and an address bus. Note that the "signal" described in this specification represents an audio signal unless specifically explained otherwise (or unless explained as a control signal).

FIG. 2 illustrates an appearance of (part of) the control panel of the digital mixer of this embodiment. On the control panel 200, various controls are disposed together with a touch panel 201 (display unit 106 of FIG. 1). 202 denotes a home button for instructing to open a home screen (FIG. 5), which will be described later, on the touch panel 201. 203 denotes a physical knob (rotary encoder) for controlling a value of a parameter corresponding to a control which is selected with a cursor among controls displayed on the touch panel (the display unit), and the knob 203 is called a "general-purpose knob" here. 204 denotes a plurality of layer buttons. Layer buttons i1 to i3 are for opening home screens of respective layers of first to eight input channels IN1 to IN8, ninth to sixteenth input channels IN9 to IN16, and seventeenth to twenty-fourth input channels IN17 to IN24. Layer buttons o1, o2 are for opening home screens of respective layers of first to eighth output channels OUT1 to OUT8 and ninth to twelfth output channels OUTS to OUT12. These five layer buttons are controlled so that only one of the layer buttons which is pressed down at last by the user is always in an ON state as the layer button of the currently selected layer.

FIG. 3 is a block diagram of signal processing in the mixer realized by the waveform I/O 108 and the DSPs 109 of FIG. 2. 301 indicates a plurality of input ports each receiving and converting an analog audio signal inputted from a signal supply source, such as a microphone or a musical instrument, into a digital audio signal and supplying the digital audio signal. Each channel of input channels 302 performs signal processing, such as level control and phase adjustment on an analog or digital audio signal received by an input port, based on parameters for each input channel in the current memory. Here, twenty-four input channels are provided. The user sets wirings between input ports and input channels, that is, assignment of one input port to each input channel by the user. Each input channel can send a digital audio signal to each of buses 303 (for example twelve buses), with a level of the audio signal controlled independently for each bus and for each input channel. Each bus 303 mixes signals supplied from any of the input channels. The mixed signal is supplied from the bus 303 to an output channel 304 corresponding to the bus. The buses 303 and output channels 304 are corresponded one by one. Each output channel performs various signal processings on the supplied signal based on values of parameters in the current memory. An output port 305 indicates a plurality of output ports each converting an audio signal supplied from an output channel of the output channels 304 into an analog audio signal, and outputting the analog audio signal.

FIG. 4 is a block diagram illustrating one channel out of the input channels 302 which comprises a plurality of processing blocks connected in series. The first block is an attenuator (ATT) 401 which performs, on the signal inputted to the channel, level control in an entrance portion thereof. The second block is an equalizer (EQ) 402 adjusts frequency characteristics of a signal. A gate (GATE) 403 is a noise gate narrowing the level of a signal so that no noise remains when the signal level decreases. A compressor (COMP) 404 performs automatic gain adjustment to compress the dynamic range of a signal. A level (LEVEL) 405 is a level adjustment unit adjusting the transmission level of a signal to each bus. A panning (PAN) 406 controls leftward-rightward orientation (panning) when a signal is outputted in stereo. The signal processing performed in each processing block is controlled based on values of parameters of a parameter set corresponding to the processing block, which are included in parameters of the one channel in the current memory. In the same way, each of the output channels 304 comprises a series of processing blocks, such as an equalizer, a compressor, and a level adjustment unit (not illustrated), and is controlled by parameter values of a plurality of parameter sets corresponding to the output channel in the current memory.

FIG. 5 illustrates an example of the home screen of the layers of input channels IN1 to IN8 to overview the channels. This home screen 500 is displayed on the touch panel when the user turns on the layer button i1, or when the user turns on the home button 202 when one of the input channels IN1 to IN8 is selected. The home screen of another layer is displayed on the touch panel likewise by an operation of the layer button or the home button.

500-1 to 500-8 each denote a vertically long area displaying some parameters of each channel of the input channels IN1 to IN8 (hereinafter referred to as a "channel display area"). In the channel display area of one channel, 500-1 for example, 501-1 denotes the channel number and name of the input channel displayed in the area. This 501-1 is always displayed on a lower side of the screen in the home screen. Four areas 511-1, 512-1, 513-1, and 514-1 are areas for displaying some parameters among parameter sets for the respective processing blocks of the attenuator 401, the equalizer 402, the gate 403, and the compressor 404 of the input channel in this order (hereinafter, an area for displaying parameters of one processing block is called a "block display area").

Note that the same explanation as the channel display area 500-1 of the input channel IN1 applies to the display areas 500-2 to 500-8 of the input channels IN2 to IN8. To the above numbers 511 to 514, "−2" is added as an index so as to represent the respective block display areas of the input channel IN2, and likewise "−3" to "−8" are added as indexes to those of the channels thereafter so as to represent the block display areas of these channels thereafter.

On lower sides of the block display areas 514-1 to 514-8 of the respective channels for displaying the parameters of the compressor 404, block display areas for displaying parameters of the level 405 and the panning 406 of the respective channels are hidden, and when upward swiping is performed on a displayed block display area on the touch panel, the block display areas are scrolled upward and these hidden block display areas are displayed.

520 denotes a cursor as a bold line. By touching any block display area once in the home screen, the user can set the cursor 520 to the touched block display area. The block display area to which the cursor 520 is set is called a "selected" area or an area in a "selected state". There is always only one block display area in the selected state on the screen. In the home screen 500, the value of the parameters in the selected block display area can be controlled by the user using the knob 203, which will be described in detail later. In FIG. 5, the block display area 514-2 displaying the parameters of the compressor 404 in the channel display area 500-2 of the second input channel IN2 is in the selected state.

When the user touches the block display area of a processing block in the selected state, a detail screen of the processing block for editing the parameter set of the relevant processing block of the channel corresponding to the touched block display area is displayed on the touch panel. For example, FIG. 6 or FIG. 8 (described later) are examples of a detail screen of the compressor 404 of a input channel i which is displayed when the block display area 514-*i* (i represents a channel number) is touched while the block display area 514-*i* is in the selected state.

Here, a one-knob mode function, characterizing the present invention, will be described. In this mixer, a one-knob mode (a parameter) is turned on or off independently for the processing block of each channel. Some processing blocks do not have the one-knob mode function. In this embodiment, among the processing blocks described in FIG. 4, the attenuator 401, the gate 403, the level 405, and the panning 406 do not have a one-knob mode function, and each of the equalizer 402 and the compressor 404 has a one-knob mode function. Hereinafter, the description will be given focusing on the one-knob mode function of the compressor 404.

A one-knob mode of a processing block takes a state of either on or off. Switching between on state and off state is performed by the user touching a one-knob button (for example, 602 in FIG. 6 or 802 in FIG. 8) displayed on a later-described detail screen of the processing block. When the one-knob mode is turned on (called "one-knob on mode" or "second mode"), a set of parameters of the processing block are controlled in an interlocked manner by the user using one common control and cannot be controlled using the individual controls corresponding to individual parameters. When the one-knob mode is turned off (called "one-knob off mode" or "first mode"), the set of parameters are individually controlled using the individual controls corresponding to individual parameters and cannot be controlled using the common control. Note that each of the common control and the individual controls may be a physical control on the control panel, may be a display image of a control displayed on a screen which can be operated by the user touching and sliding them or so on, or may be a control by any other manner.

Regarding to some of the block display areas in the home screen 500, an icon of a numeral "1" surrounded by a circle is displayed on a top left side thereof. This icon is called a "one-knob icon" here. A one-knob icon in a block display area of a processing block indicates that the one-knob mode of the processing block is turned on (the processing block is in one-knob on mode). For example, a one-knob icon 521 in the block display area 514-1 indicates that the compressor 404 of the first input channel IN1, is in one-knob on mode (second mode). On the other hand, no one-knob icon in the block display area 514-2 indicates that the compressor 404 of the second input channel IN2 is in one-knob off mode (first mode). The one-knob icon is never displayed in the block display areas 511-*i*, 513-*i* because the attenuator and the gate do not have the one-knob mode function.

FIG. 6 illustrates an example of a detail screen 600 of a compressor 404 in one-knob off mode, which is displayed on the touch panel, for example, when the user further touches a block display area (for example, 514-2) for the compressor 404 (in one-knob off mode) of a channel (for example, IN2) in the home screen of FIG. 5 while the block display area (for example, 514-2) of the channel is in the selected state. 601 denotes a header display indicating that the detail screen 600 is for setting the parameters of the compressor 404. 602 denotes a one-knob button for switching on and off of the one-knob mode. In FIG. 6, the one-knob button 602 is displayed in off state indicating that the one-knob mode of the compressor 404 is turned off (illustrated in gray). 603 denotes a level meter indicating the current level of an audio signal inputted to the compressor 404 of the channel. 604 denotes a gain reduction meter indicating the current compression amount of the audio signal by the compressor 404. 605 denotes a level meter indicating the current level of the audio signal outputted from the compressor 404. These levels of the meters change constantly depending upon the signal inputted to the compressor 404.

611 to 616 indicate individual controls (individual elements) for individually controlling a set of parameters defining signal processing operation of the compressor 404. 611 denotes a control for adjusting a threshold indicating a level of the input audio signal to start compression. 612 denotes a control for adjusting a ratio of compression amount versus an exceeded amount of the input audio signal over the threshold. 613 denotes a control for adjusting an attack time representing a delay time of raising the compression amount after the level of the input audio signal exceeds the threshold. 614 denotes a control for adjusting a release time representing a delay time of dropping the compression amount after the level of the input audio signal falls below the threshold. 615 denotes a control for adjusting an output gain of the output audio signal. 616 denotes a control for selecting a knee value defining degree of compression at the level of the threshold.

The controls 611 to 615 are slider-type controls for the user to change the value of the corresponding parameter by the user sliding a knob part (knob 631 for the control 611 for example) of the slider-type control on the screen in a longitudinal direction of the control while touching the knob part with a finger. Otherwise, by the user touching one of the controls 611 to 615 to bring it into a selected state and operating the knob 203, which is a physical knob, the value of the parameter corresponding to the control in the selected state can also be changed. In this case, the knob 203 functions as a control for adjusting the value of the parameter corresponding to the individual control in the selected state. The control 616 is a button-type control and allows the user to set a knee value by selecting one of three values, namely Soft, Med, and Hard by touching any one of three buttons.

The adjusted value of the threshold (the threshold value) is displayed as the position of the knob 631 of the control 611 and a numeric value 621. The value of ratio (the ratio value) is displayed as the position of the knob of the control 612 and a numeric value 622. The attack time value is displayed as the position of the knob of the control 613 and a numeric value 623. The release time is displayed as the position of the knob of the control 614 and a numeric value 624. The output gain value is displayed as the position of the knob of the control 615 and a numeric value 625. 626 denotes display area for a compression curve based on the threshold value, the ratio value, and the knee value. The button-type control 616 represents the set knee value by displaying one button corresponding to the knee value among the three buttons in on state and the other two buttons in off state.

FIG. 7 illustrates a state after values of several parameters are changed by the user in the detail screen of FIG. 6. Here, because the slider-type controls 611, 612, and 615 for threshold, ratio, and output gain are operated, the positions of the knobs of the operated controls 611, 612, and 615, and the numerals 621, 622, and 625, and the compression curve in the display area 626 are changed. Changing of the values of the parameters such as from FIG. 6 to FIG. 7 corresponds to changing a value of a parameter in a first mode.

FIG. 8 illustrates an example of a detail screen 600 of a compressor 404 in one-knob on mode, which is displayed, for example, when the user further touches the block display area (for example, 514-1) for the compressor 404 (in one-knob on mode) of the channel (for example, IN1) in the home screen of FIG. 5 while the block display area (for example, 514-1) is in the selected state. Respective parts denoted by 801, 802, 803, and so on in FIG. 8 and respective parts denoted by 601, 602, 603, and so on in FIG. 6 correspond to each other by those pairs having the same last 2-digit numbers. A header 801, meters 803 to 805, and a compression curve in a display area 826 are displayed similarly to corresponding parts 601, 603 to 605, and 626 in FIG. 6. A one-knob button 802 corresponds to the button 602 of FIG. 6, but is displayed in on state indicating that the one-knob mode of the compressor 404 is turned on (here illustrated in white).

841 denotes an one-control (one-element) of slider type displayed only in one-knob on mode, and 842 denotes a knob of the slider. The user uses the one-control 841 to change a value of a parameter called a "one-parameter" here. The one-parameter takes a numeric value in the range of 0 to 100. The larger value of the one-parameter indicates the larger sound effect of the processing block. By the user sliding leftward or rightward along a longitudinal direction of the one-control 841 while touching the knob part 842, the value of the one-parameter is increased or decreased. As for a processing block in one-knob on mode, the knob 203 (a physical knob) functions as a dedicated control for setting the one-parameter, similarly to the one-control 841. For example, while the detail screen 800 of FIG. 8 is displayed on the touch panel, there is no other operable control than the one-control 841 on the screen, and thus the one-control 841 is always in a selected state for the knob 203, and the value of the one-parameter is changed in accordance with an operation on the physical knob 203. At this time, the set value of the one-parameter is reflected on the position of the knob 842 and the numeric value 843 on the detail screen 800.

As for the compressor 404 in one-knob on mode, the three parameters (threshold, ratio, and output gain) can be controlled in an interlocked manner using the one-control 841 or the knob 203. Specifically, data of a variation curve which defines a set of three values of the three parameters corresponding to each value of the one-parameter is prepared in advance, and the CPU 101 determines three values of the three parameters by referring to the variation curve with a value of the one-parameter set by the user. In FIG. 8, the one-parameter is set at "97" (see 841, 843), and the threshold is set at "−32" (see 811, 821), the ratio is set at "3.0:1" (see 812, 822), and the output gain is set at "+12.2" (see 815, 825) in accordance with the value of the one-parameter. Here, since the variation curve is not for all parameters of the compressor 404 but for only a part (three parameters) of the parameters, data size of the variation curve is small and the CPU load is light as compared to cases where a variation curve for all the parameters is employed.

Slider-type controls 811 to 815 correspond to slider-type controls 611 to 615 of FIG. 6. However, their knobs are not displayed, and the user cannot individually set values of the parameters using the controls 811 to 815. Further, a button-type control 816 corresponds to the button-type control 616 of FIG. 6, but is displayed with a shade on an upper half of the button (the upper half illustrated in dark gray in FIG. 8), and the user is not allowed to control it. Such states in which a control does not accept any operation from the user is called "non-operable state" and a control in non-operable state is expressed as a "masked" control here. Conversely, a state in which a control accepts an operation from the user is "operable state". When the one-knob mode is turned on in a processing block, the parameters of the processing block can be edited by the user only via the one-control 841 which is the common control (one-element), and individual editings of the parameters using the individual controls (individual elements) are not available. Note that while the one-knob mode is turn on, it is not always necessary to control all the parameters for the processing block in an interlocked manner. The common control controls only predetermined parameters among all the parameters for the processing block may be controlled in the interlocked (linked) manner, and the other parameters may be unchanged as constants. As for the compressor 404 in the mixer of this embodiment, the three parameters of threshold, ratio, and output gain are controlled in the interlocked manner by the user using the common control, and the other parameters are left unchanged. Note that in the present invention, while a processing block is in the one-knob on mode, in order to make the user determine values of the parameters of the processing block only via the common control, individual controls corresponding to the parameters other than the predetermined parameters are also masked.

Note that although the controls 811 to 815 cannot be operated in the one-knob on mode, a boundary is displayed in each of the controls at a position corresponding to the position of the knob to indicate the value of the corresponding parameter. In the detail screen 800 of FIG. 8, the values of all parameters of the processing block, that is, the values of the three parameters set by the user using the one-parameter, the values of the other parameters as constants are displayed as the positions of the boundaries in the controls 811 to 815, numeric values 821 to 825, the ON-display of the button-type control 816, and the compression curve in the display area 826.

FIG. 9 illustrates a state after the value of the one-parameter is changed by the user in the detail screen of FIG. 8. Here, the value of the one-parameter is changed by the user operating the one-control 841 or the knob 203, and, as a result, the position of the knob 842 and the numeric value 843 are changed. In detail, according to the change of the value of the one-parameter, the values of the three parameters of threshold, ratio, and output gain are changed, and the positions of the boundaries in the controls 811, 812, and 815, the displays of the numeric values 821, 822, and 825, and the compression curve in the display area 826 are changed according to the changed parameters. The values of the other parameters are not changed from FIG. 8. Changing of the values of the parameters such as from FIG. 8 to FIG. 9 corresponds to changing the value of one-parameter and controlling values of parameters in a second mode.

Next, switching between the one-knob off mode and the one-knob on mode will be described. In the detail screen 600 where the compressor 404 is in the one-knob off mode as described in FIG. 6 or FIG. 7, by touching the one-knob button 602 (a second switching instruction), the user can turn on the one-knob mode (switching the processing block into the second mode). In this case, in the one-knob off mode, the user can control the parameters individually using the individual controls, and thus the combination of the values of the all parameters of the compressor 404 may be out of the range controllable via the one-parameter (controllable by the user using the one-control). Accordingly, in the mixer of this embodiment, when the one-knob mode of a processing block is switched from off to on by the user, all parameters (which are included in a parameter set) of the processing block are initialized or set to initial values corresponding to the one parameter of an initial value (zero).

FIG. 10 illustrates an example of a confirmation dialog box displayed in front of the detail screen 600 when the one-knob button 602 is touched on the detail screen 600 while the processing block is in the one-knob off mode as described in FIG. 6 or FIG. 7. The dialog box 1000 includes a message confirming whether the user really permits to turn on the one-knob mode, with a cancel button (no permission), and an OK button (permission). The message may include a caution stating that all parameters will be initialized if OK is selected. If the user operates the cancel button (no permission), the dialog box 1000 is deleted while keeping the one-knob mode being turned off, the display is returned to the original detail screen 600. If the user operates the OK button (permission), the one-knob mode of the processing block is turned on. Besides the turning on, all parameters of the processing block of which the one-knob mode is turned on are initialized, and the detail screen of the processing block in the one-knob on mode is displayed on the touch panel. By such a confirmation dialog box 1000, the mixer makes the user pay attention to the initialization of the parameters when turning on the one-knob mode.

The above-described switching of the one-knob mode from off to on corresponds to switching the processing block from the first mode to the second mode. Further, the processing of confirming the user's permission by using the confirmation dialog box corresponds to accepting a permission.

FIG. 11 illustrates an example of a detail screen 1100 of the compressor 404 which is displayed on the touch panel when the user operates the OK button in the dialog box 1000 of FIG. 10 and the one-knob mode is turned on. Respective parts denoted by 1101, 1102, 1103, and so on in FIG. 11 and respective parts denoted by 801, 802, 803, and so on in FIG. 8 correspond to each other by those pairs having the same last 2-digit numbers. Here, all parameters of the compressor 404 are initialized corresponding to the value zero of the one-parameter. The value zero of the one-parameter means that the compression effect by the compressor 404 is at the minimum (namely zero), and the inputted signal is outputted as it is from the compressor 404. The value zero of the one-parameter is displayed as the position of the knob of the one-control 1131 and a numeric value 1132, and based on the values of the initialized parameters, the displays of controls 1111 to 1115, numeric values 1121 to 1125, a button 1116, and a compression curve in the display area 1126 are controlled. Note that the initial value of the knee value corresponding to the button-type control 1116 is "Med", and the button-type control 1116 is not operable. After the one-knob mode is turned on and the detail screen of FIG. 11 is displayed on the touch panel, the user can set values of the parameter as described in FIG. 8 or FIG. 9 by operating the one-control 1131 or the knob 203 on the detail screen.

When the one-knob button 802 or 1102 is touched (a first switching instruction) on the detail screen 800 or 1100 by the user where the compressor 404 is in the one-knob on mode as described in FIG. 8, FIG. 9, or FIG. 11, the one-knob mode is switched from on state (second mode) to off state (first mode). In this case, the values of all parameters (a parameter set) of the compressor 404 in the current memory are inherited as they are without being initialized, and the screen changes to the detail screen 600 (FIG. 6 or FIG. 7) of the compressor 404 in the one-knob off mode. Here, since the values of the parameters are kept unchanged, a confirmation dialog box is not necessary and not displayed.

The above-described switching from the one-knob on mode to the one-knob off mode corresponds to switching from the second mode to the first mode.

When the home button 202 is operated by the user while the detail screen 600, 800 or 1100 of a processing block of a channel as illustrated in FIG. 6 to FIG. 9 or FIG. 11 is displayed, the home screen 500 of the layer including the channel as illustrated in FIG. 5 is displayed on the touch panel. At this moment, the cursor 520 is set on a block display area of the processing block of the channel on the home screen 500. The detail screen 600, 800 and 1100 was originally displayed in response to the user touching the display area of the processing block twice on the home screen 500, and when the screen returns to the home screen 500 again, the cursor 520 is displayed on the display area of the same processing block. However, since the user can change a processing target from the processing block of the channel to a corresponding processing block of another channel in the detail screen 600, 800 and 1100, the position of the cursor 520 may be changed to the display area of the corresponding processing block of another channel. If the one-knob mode of a processing block is switched between on and off in the detail screen of the processing block, when the screen returns to the home screen, the one-knob icon 521 is displayed or not displayed accordingly.

Adjustment of parameters in the home screen in FIG. 5 will be described. By the user setting the cursor on the display area of any processing block in the home screen 500 to bring it to the selected state and operating the knob 203, the user can control a parameter of the selected processing block (corresponding to the selected display area). In this case, when a display area in the selected state is of a processing block without the one-knob mode function, a value of a parameter among parameters of the processing block is changed by the user operating the knob 203. For example, if the cursor is on the display area 511-1 of the attenuator 401 of the first input channel IN1, the attenuation amount of the attenuator 401 can be controlled by the user operating the knob 203. The attenuator 401 does not have the one-knob mode, and the operating target in the home screen 500 is predetermined to its attenuation amount.

When the display area of the processing block with the one-knob mode function is in the selected state and the one-knob mode of the processing block is turned off, the value of one predetermined parameter for the processing block is changed by the user operating the knob 203. This predetermined parameter will be called a "representative parameter" here. The representative parameter is predetermined for each type of processing blocks. For example, the threshold is the representative parameter for a compressor 404 of any channel. Therefore, when the cursor is on the display area 514-2 of the compressor 404 of the second input channel IN2 for which the one-knob mode is turned off, the threshold value of the compressor 404 can be controlled by the user operating the knob 203.

When the display area of the processing block having the one-knob mode is in the selected state and the one-knob mode is turned on for the processing block, the value of the one-parameter of the processing block can be changed by the user operating the knob 203, so as to determine the values of all parameters for the processing block in accordance with the value of the one-parameter. For example, when the cursor is on the display area 514-1 of the compressor 404 of the first input channel IN1, by changing the value of the one-parameter for the compressor 404 by the user operating the knob 203, values of the three parameters is changed in accordance with the value of the one-parameter in an interlocked manner, and values of all parameters for the compressor 404 including the constants are determined in accordance with the value of the one parameter.

Note that in the home screen, each block display area of each channel is limited and not wide, and thus all of meters and parameters for each processing block cannot be displayed in the display area. Accordingly, for each type of processing blocks, only predetermined part of meters and values for parameters are displayed in the corresponding display area. For example, only a predetermined parameter, such as an attenuation amount, is displayed in the display area 511-*i* for the attenuator 401. Particularly in the case of the processing block having the one-knob mode, the value of the one-parameter is displayed while the one-knob mode is turned on for the processing block, and the value of the representative parameter is displayed while the one-knob mode is turned off, in the corresponding display area. For example, in the display area 514 of the compressor 404, the gain reduction meter and the level meter of the output signal are displayed as basic display elements. Moreover, in the display area 514-1 where the one-knob mode is turned on, the current value "97" of the one-parameter is displayed on an upper right side thereof, and in the display area 514-2 where the one-knob mode is turned off, the value "−32" of the threshold which is the representative parameter is displayed on an upper right side thereof.

Next, with reference to FIG. 12A to FIG. 14B, processing executed by the CPU 101 for realizing the above-described operation will be described. Note that the current memory stores values of all parameters (which are included in a parameter set) of each processing block of each channel as setting data, and the values of the parameters stored in the current memory are constantly reflected on the displays of the values of the parameters on the above-described home screen 500 or detail screen 600, 800, 1100. Further, changing of values of various parameters in the following processing corresponds to changing corresponding parameter data in the current memory. The parameter data in the current memory are also constantly reflected on signal processing in the DSPs 109 in the background processing (not illustrated) by the CPU 101. Further, the value (on or off) of the one-knob mode of each processing block of each channel is also stored in the current memory.

FIG. 12A illustrates a flowchart of process to open the detail screen of a compressor 404 of a channel from the home screen 500. This process is executed when a display area of the compressor 404 of the channel in selected state on the home screen is touched by the user. In step 1201, the CPU 101 determines whether the one-knob mode of the compressor 404 corresponding to the operated display area is in on state or in off state. If the one-knob mode is in on state, the CPU 101 controls the display unit 106 to display the detail screen 600 (FIG. 6 or FIG. 7) of the compressor 404 corresponding to the operated display area for the case where the one-knob mode is turned off in step 1202. If the one-knob mode is turned on, the CPU 101 controls the display unit 106 to display the detail screen 800 (FIG. 8 or FIG. 9) of the same compressor 404 for the case where the one-knob mode is turned on in step 1203.

FIG. 12B illustrates a flowchart of process executed when the knob 203 is operated with respect to the compressor 404 of a certain channel while the home screen 500 is displayed. This process is executed when the knob 203 is operated in a state where the display area of the compressor 404 of any channel is selected in the home screen 500.

In step 1211, the CPU 101 determines whether the one-knob mode of the compressor 404 corresponding to the selected display area is turned on or off. When the one-knob mode is turned off, in step 1212, the CPU 101 changes the value of the threshold for the compressor 404 corresponding to the selected display area in the current memory to increase or decrease the value according to the operation amount of the knob 203. Next, in step 1213, the CPU 101 controls the display unit 106 to update the display of the value of the threshold for the same compressor 404 in the home screen 500. When the one-knob mode is turned on in step 1211, the CPU 101 changes the value of the one-parameter for the compressor 404 corresponding to the selected display area in the current memory to increase or decrease the value according to the operation amount of the knob 203 in step 1214. Next, in step 1215, the CPU 101 determines values of the above-described three parameters for the same compressor 404 in accordance with the value of the one-parameter, updates the values of the three parameters in the current memory to the newly determined values. In step 1216, the CPU 101 controls the display unit 106 to update the display of the value of the one-parameter for the same compressor 404 in the home screen 500.

FIG. 13A is a flowchart of process executed when an individual control (one of 611 to 615) is operated in the detail screen 600 (FIG. 6 or FIG. 7) of the compressor 404 for which the one-knob mode is turned off. Note that this process is executed also when one of the individual controls 611 to 615 is selected and then the knob 203 is operated by the user. In step 1301, the CPU 101 changes (increases or decreases) the value of the parameter corresponding to the operated control in the current memory according to the operation amount of the individual control. In step 1302, the CPU 101 controls the display unit 106 to update, based on the changed value of the parameter, the position of the knob of the operated individual control and the display of the numeric value, and also the display of the compression curve as necessary.

FIG. 13B is a flowchart of process executed when the one-knob button is operated in the detail screen 600 (FIG. 6 or FIG. 7) of the compressor 404 in the one-knob off mode. In step 1311, the CPU 101 controls the display unit 106 to display the confirmation dialog box 1000 of FIG. 10 in front of the detail screen 600 to accept an input from the user. When the user selects OK, the process proceeds from step 1312 to step 1313, and the CPU 101 switches the compressor 404 from the one-knob off mode into the one-knob on mode. Next, in step 1314, the CPU 101 initializes all parameters and the one-parameter of the compressor 404 in the current memory. Next, in step 1315, the CPU 101 controls the display unit 106 to display the detail screen 1100 (initial state) of the compressor 404 in one-knob on mode as in FIG. 11. When the user selects cancel in step 1311, the CPU 101 erases the confirmation dialog box 1000 and ends the processing at step 1312.

FIG. 14A is a flowchart of process executed when the one-control 841 or the knob 203 is operated on the detail screen 800 (FIG. 8 or FIG. 9) of the compressor 404 in the one-knob on mode. In step 1401, the CPU 101 changes (increases or decreases) the value of the one-parameter of the one-control in the current memory according to the operation amount of the one-control. In step 1402, the CPU 101 determines the values of the above-described three parameters of the compressor 404 with reference to the variation curve in accordance with the value of the one-parameter, and writes the values of the three parameters in the current memory. In step 1403, the CPU 101 controls the display unit 106 to update the position of the knob 842 of the one-control 841, the display of the numeric value 843 of the one-parameter, the positions of the boundaries of the respective controls corresponding to the three parameters, and the displays of numeric values of the three parameters, and the display of the compression curve in the display area 826, in the detail screen 800, based on the one-parameters and the three parameters.

FIG. 14B is a flowchart of process executed when the one-knob button 802 is operated on the detail screen 800 (FIG. 8 or FIG. 9) of the compressor 404 in the one-knob on mode. In step 1411, the CPU 101 switches the compressor 404 from the one-knob on mode into the one-knob off mode. Next, in step 1412, the CPU 101 controls the display unit 106 to display the detail screen 600 of the compressor 404 in the one-knob off mode.

In the above embodiment, in either case of the home screen 500 and the detail screen 600, 800, with respect to a processing block in the one-knob on mode, only parameter control via the one-parameter using the one-control 841 or the knob 203 is enabled, the other individual controls are all disabled, and the value of the one-parameter can be confirmed on the screen 500, 600, and 800. Thus, the user can control the processing block while focusing only on the value of the one-parameter. Therefore, it is easy even for a beginner to control the processing block. Further, it is convenient for any user to use the one-parameter to adjust parameters of a processing block roughly in the one-knob on mode before adjusting precisely the individual parameters of the processing block in the one-knob off mode.

In the home screen 500, the user can select the display area of any processing block and control parameters for the processing block using the knob 203, and hence the user can perform setting of the parameters while easily switching the operation target. In this case, for the processing block in the one-knob on mode, the user can determine values of all parameters via the knob 203 or the one-control, and for the processing block in the one-knob off mode, the user can flexibly control value of the representative parameter via the knob 203 and values of the parameters via the individual controls. Thus, convenient setting of the parameters in the home screen 500 can be performed.

According to the above embodiment, when a certain processing block is switched from the first mode to the second mode, all parameters of the certain processing block are initialized, and during the second mode, the individual elements are masked and only the one element becomes operable. Thus, the user can, without minding past values set using the individual elements at all, focus on operating the one element to control the certain processing block. Further, when the processing block is switched from the second mode to the first mode, the mask of the individual elements is released while all the values of the parameters are unchanged and inherited, and thus the user can control in detail the processing block using a plurality of individual elements based on the values set using the one element. Further, the individual elements are masked in the second mode, and the one element is displayed only in the second mode. Thus, the user can easily recognize whether the processing block is currently the first mode or the second mode by seeing the state of display of the individual elements and the one element. By confirming with the user at the time of switching from the first mode to the second mode, it is possible to prevent the values of the parameters adjusted in detail using the individual elements from being lost by accidental switching to the second mode by the user.

Note that in the embodiment, although the compressor is mainly described as an example, the present invention is applicable to setting of parameters for any other processing blocks. Further, in the above-described embodiment, although setting of parameters for the processing block of the input channel of the mixer is explained as an example, the present invention is applicable to setting of parameters for processing blocks of the output channel of the mixer and, besides that, for various processing blocks of any channel of any audio device, such as a recorder, an amplifier, or a speaker.

In the embodiment, the example in which only one general-purpose knob 203 is provided is explained. However, for example, under the channel display areas 500-1 to 500-8 on the home screen of FIG. 5 displayed by the display unit 201, eight physical knobs may be provided instead of the knob 203. In this case, it may be configured such that eight cursors 520 selects eight display areas of eight processing blocks of eight channels by a line at a time (for example, for the compressor 404, all display areas 514-1 to 514-8 of channels IN1 to IN8 are simultaneously selected), and eight parameters of the selected eight processing blocks is adjusted in parallel by the user using the eight physical knobs under the display unit 201. Conversely, the mixer may not have any physical knob, and all operations in the detail screen 600, 800 may be performed by the user using only touch panel.

In the embodiment, three parameters of the compressor 404 are controlled in an interlocked manner via the one-parameter when the one-knob mode is turned on, but the number of parameters controlled in the interlocked manner is not limited to three, and any number of parameters of a processing block may be controlled via the one-parameter processing blocks.

In the embodiment, although only one variation curve for determining values of three parameters from value of the one-parameter is prepared, but any number of variation curve may be prepared and one variation curve may be selected from the prepared variation curves and used. Further, the number of the parameters determined based on one variation curve is not limited to three. Number of parameters of which values are determined based on one variation curve may vary among the variation curves. In this case, values of parameters not determined based on the variation curve may be constants, similarly to the above-described embodiment. Moreover, different variation curves (that is, different control rule) may be selectively applied depending on the type of an audio signal to be processed. Concretely, a type of the audio signal (such as a percussion type or a vocal type) may be specified for each channel, and the variation curve is automatically selected and applied depending on the specified type. For example, if the percussion instrument type is set for a channel, a first variation curve suitable for a percussion instrument is applied to a compressor of the channel when the one-knob mode is turned on, and if the vocal type is set for a channel, a second variation curve suitable for vocal is applied to a compressor of the channel when the one-knob mode is turned on.

In the embodiment, as illustrated in FIG. 8 and FIG. 9, while a processing block is in the one-knob on mode, the knob parts of the individual controls are not displayed so as to express that the individual controls are non-operable, non-operability may be indicated in the other ways, for example by changing colors, brightness or shapes of the controls, instead of not displaying the knobs.

The display unit of the embodiment is a touch panel, but a display having no touch sensor may be used with a pointing device, such as a mouse or a touch pad.

In the above-described embodiment, the detail screen of a processing block is displayed by touching a block display area in the selected state on the home screen. However, a dedicated button to open the detail screen of each processing block may be provided, and the detail screen may be displayed when the dedicated button is operated, regardless of whether the block display area is in the selected state or not.

REFERENCE SIGNS LIST

101 . . . central processing unit (CPU), 102 . . . flash memory, 103 . . . RAM, 104 . . . moving fader, 106 . . . display unit, 107 . . . control, 108 . . . waveform I/O, 109 . . . signal processing unit.

The invention claimed is:

1. A method for setting values of parameters of a parameter set of a processing block of an audio device, the method comprising:

- on accepting a first switching instruction from a user, switching the processing block from a second mode into a first mode while keeping the values of parameters of the parameter set of the processing block unchanged;
- while the processing block is in the first mode, controlling a display to display individual elements indicating the values of individual parameters of the parameter set of the processing block in an operable state;
- on accepting an operation on an element among the displayed individual elements from the user while the processing block is in the first mode, changing a value of a parameter corresponding to the element;
- while the processing block is in the second mode, controlling the display to display the individual elements indicating the values of the individual parameters of the parameter set of the processing block in a non-operable state, and further display one-element indicating a value of one-parameter;
- on accepting an operation on the displayed one-element from the user while the processing block is in the second mode, changing the value of the one-parameter, and controlling values of parameters among the parameter set of the processing block based on the changed value of the one-parameter; and
- on accepting a second switching instruction from the user to switch the processing block from the first mode into the second mode, initializing the values of the parameters among the parameter set of the processing block that are controllable based on the changed value of the one-parameter without initializing values of parameters of the parameter set that are not controllable based on the changed value of the one-parameter such that each of the initialized values of the parameters among the parameter set of the processing block that are controllable based on the changed value of the one-parameter corresponds to an initialization value of the one-parameter, and switching the processing block from the first mode into the second mode.

2. The method according to claim 1, further comprising:

after accepting the second switching instruction and before executing the initializing, accepting a permission from the user, and wherein the initializing and the switching of the processing block into the second mode is executed only if the permission is accepted.

3. The method according to claim 1, wherein the audio device includes a plurality of processing blocks and each processing block of the plurality of processing blocks is independently set in the first mode or in the second mode, the method further comprising:

controlling the display to display an overview screen including a plurality of block display areas corresponding to the plurality of the processing blocks and each displaying information of the corresponding processing block, wherein a block display area of a processing block in the first mode displays a value of a representative parameter among the parameter set of the processing block and a block display area of a processing block in the second mode displays the value of the one-parameter of the processing block.

4. The method for setting the parameter set according to claim 3, further comprising:

while a block display area of a processing block in the first mode is selected, on accepting a value change instruction from the user, changing a value of a representative parameter of the processing block, and while a block display area of a processing block in the second mode is selected, on accepting a value change instruction from the user, changing the value of the one-parameter of the processing block and controlling the values of parameters among the parameter set of the processing block based on the value of the one-parameter.

5. The method according to claim 1, wherein the controlling the values of the parameters among the parameter set of the processing block based on the changed value of the one-parameter is performed based on a variation curve defining variation in the values of the parameters in accordance with the value of the one-parameter, a plurality of the variation curves are prepared, and one of the variation curves is selected for use in the controlling the values of the parameters.

6. The method according to claim 5, wherein values of which parameters are controlled based on the value of the one-parameter is respectively defined for each of the variation curves.

7. The method according to claim 5, wherein the one of the variation curves is selected based on a type of an audio signal to be processed in the processing block.

8. An apparatus for setting values of parameters of a parameter set of a processing block of an audio device, the apparatus comprising:

a memory configured to store the values of the parameters;

a display;

a control configured to accept an operation by a user; and a processor configured to control the apparatus, wherein the processor is configured to:

on accepting a first switching instruction from the user via the control, switch the processing block from a second mode into a first mode while keeping the values of parameters of the parameter set of the processing block stored in the memory unchanged;

while the processing block is in the first mode, control the display to display individual elements indicating the values of individual parameters of the parameter set of the processing block in an operable state;

on accepting the operation on the element among the displayed individual elements from the user via the control while the processing block is in the first mode, change a value of a parameter stored in the memory corresponding to the element;

while the processing block is in the second mode, control the display to display the individual elements indicating the values of the individual parameters of the parameter set of the processing block in a non-operable state, and further display one-element indicating a value of one-parameter;

on accepting the operation on the displayed one-element from the user via the control while the processing block is in the second mode, change the value of the one-parameter stored in the memory, and control values of parameters among the parameter set of the processing block stored in the memory based on the changed value of the one-parameter; and on accepting a second switching instruction from the user to switch the processing block from the first mode into the second mode via the control, initialize the values of the parameters among the parameter set of the processing block that are controllable based on the changed value of the one-parameter without initializing values of parameters of the parameter set that are not controllable based on the changed value of the one-parameter such that each of the initialized values of the parameters among the parameter set of the processing block that are controllable based on the changed value of the one-parameter corresponds to an initialization value of the one-parameter, and switch the processing block from the first mode into the second mode.

* * * * *